United States Patent
Natsumeda et al.

(10) Patent No.: US 11,329,526 B2
(45) Date of Patent: May 10, 2022

(54) STATOR, STATOR ASSEMBLY, AND TRANSDUCER FOR CONVERTING BETWEEN ELECTRICAL ENERGY AND MECHANICAL ENERGY

(71) Applicant: Murata Manufacturing Co., Ltd., Nagaokakyo (JP)

(72) Inventors: Mitsutoshi Natsumeda, Nagaokakyo (JP); Eiji Sakaguchi, Nagaokakyo (JP); Hisato Amano, Nagaokakyo (JP); Takashi Sakurada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 148 days.

(21) Appl. No.: 16/801,589

(22) Filed: Feb. 26, 2020

(65) Prior Publication Data
US 2020/0280235 A1  Sep. 3, 2020

(30) Foreign Application Priority Data

Feb. 28, 2019  (JP) .............................. JP2019-036201
Dec. 6, 2019  (JP) .............................. JP2019-221127

(51) Int. Cl.
*H02K 3/52*  (2006.01)

(52) U.S. Cl.
CPC ......... *H02K 3/522* (2013.01); *H02K 2203/09* (2013.01)

(58) Field of Classification Search
CPC ........................... H02K 3/522; H02K 2203/09
See application file for complete search history.

(56) References Cited

U.S. PATENT DOCUMENTS

| 7,557,478 B2 * | 7/2009 | Hoshika | H02K 3/522 310/180 |
| 7,595,572 B2 * | 9/2009 | Haga | H02K 3/522 310/194 |
| 7,663,287 B2 * | 2/2010 | Haga | H02K 3/522 310/260 |
| 7,855,484 B2 * | 12/2010 | Sasaki | H02K 3/522 310/194 |

(Continued)

FOREIGN PATENT DOCUMENTS

| JP | 2010158099 A | 7/2010 |
| JP | 2016013053 A | 1/2016 |

OTHER PUBLICATIONS

Chinese Office Action issued for corresponding Chinese Patent Application No. 202010116054.X, dated Dec. 22, 2022.

*Primary Examiner* — Robert W Horn
(74) *Attorney, Agent, or Firm* — ArentFox Schiff LLP

(57) ABSTRACT

A stator member may include a columnar stator core, a linear coil, and an insulating insulator. The linear coil may be wound around the stator core. The insulator may be disposed between the stator core and the coil. Furthermore, the insulator may include a central member and an outer member. The central member may cover the stator core. The outer member may be connected to an outside of the central member in an axial direction of the stator core. The outer member may include a surface extending in a thickness direction in which the central member and the outer member are arranged, and a groove recessed in a direction orthogonal to the thickness direction from the surface. A connection terminal of a busbar member may be inserted into the groove.

18 Claims, 10 Drawing Sheets

(56) References Cited

U.S. PATENT DOCUMENTS

| | | | | |
|---|---|---|---|---|
| 8,314,528 B2* | 11/2012 | Shinohara | .............. | H02K 3/522 310/194 |
| 8,376,072 B2* | 2/2013 | Sagara | ................... | H02K 5/08 180/65.51 |
| 9,000,629 B2* | 4/2015 | Yokogawa | .............. | H02K 15/12 310/43 |
| 9,154,010 B2* | 10/2015 | Yokogawa | .............. | H02K 3/522 |
| 9,312,737 B2* | 4/2016 | Ryu | ....................... | H02K 5/225 |
| 10,050,485 B2* | 8/2018 | Shirasaka | ............... | H02K 1/14 |
| 10,615,667 B2* | 4/2020 | Kimoto | .................... | H02K 5/20 |
| 10,680,482 B2* | 6/2020 | Okamoto | .............. | H02K 1/146 |
| 2003/0011271 A1* | 1/2003 | Takano | .................. | H02K 3/522 310/254.1 |
| 2004/0007935 A1* | 1/2004 | Kimura | ................. | H02K 3/522 310/71 |
| 2006/0043806 A1* | 3/2006 | Torii | ..................... | H02K 3/522 310/71 |
| 2009/0102312 A1* | 4/2009 | Tsukashima | ........... | H02K 5/225 310/215 |
| 2010/0244597 A1* | 9/2010 | Sugiyama | .............. | H02K 3/522 310/71 |
| 2014/0015349 A1* | 1/2014 | Chamberlin | ........... | H02K 3/522 310/43 |
| 2019/0102312 A1* | 4/2019 | McDonnell | ......... | G06F 12/0828 |
| 2019/0260255 A1* | 8/2019 | Kuwahara | ............... | H02K 3/325 |
| 2019/0296611 A1* | 9/2019 | Kimoto | .................... | H02K 5/20 |
| 2020/0052542 A1* | 2/2020 | Gentz | ..................... | H02K 3/52 |
| 2020/0280235 A1* | 9/2020 | Natsumeda | ............ | H02K 3/325 |
| 2020/0280775 A1* | 9/2020 | Natsumeda | ............ | H02K 11/33 |

* cited by examiner

STATOR, STATOR ASSEMBLY, AND TRANSDUCER FOR CONVERTING BETWEEN ELECTRICAL ENERGY AND MECHANICAL ENERGY

CROSS REFERENCE TO RELATED APPLICATIONS

This application claims priority to Japanese Patent Application No. 2019-036201, filed Feb. 28, 2019, and Japanese Patent Application No. 2019-221127, filed Dec. 6, 2019, the entire contents of each of which are hereby incorporated in their entirety.

TECHNICAL FIELD

Aspect of the present disclosure relate to a stator having an insulator disposed on a stator core, a stator assembly including the stator, and a transducer for converting electrical energy and mechanical energy.

BACKGROUND OF THE INVENTION

Japanese Unexamined Patent Application Publication No. 2016-13053 discloses a motor. The motor disclosed in the Japanese Unexamined Patent Application Publication No. 2016-13053 includes a stator core and a busbar. The stator core is made of a plurality of teeth, where a winding wire is wound around each tooth. The plurality of teeth are arranged at equal intervals in a circumferential direction.

The busbar is adjacent to the stator core in an axial direction of the motor. The busbar is provided with an annular base portion and a connection portion connected to the base portion. The connection portion protrudes to an opposite side to a side on which the stator core is disposed, with respect to the base portion. The connecting portion has two opposing flat plates.

When the winding of the tooth and the busbar are connected to each other, an operator draws part of the winding formed in a loop shape to an outside and inserts the part between the two flat plates of the connecting portion. Then, the operator performs welding or the like in a state where the drawn part of the winding is sandwiched between the two flat plates of the connecting portion.

However, the motor structure of Japanese Unexamined Patent Application Publication No. 2016-13053, does not always have a constant positional relationship between the winding of the tooth and the connecting portion of the busbar.

Thus, joining of the winding of the tooth, that is, the winding (coil) of the stator and the connection portion of the busbar is not easy nor consistent.

SUMMARY OF THE INVENTION

Accordingly, it is an object of the present invention to provide a stator having structure which facilitates connection between a coil of a stator and a busbar, and a stator assembly, a motor and a generator, using the stator.

According to aspects of the present invention, the stator of the present disclosure includes a stator core, an insulating insulator, and a linear coil. The stator core may have a shape extending along an axial direction, and has a side surface extending in the axial direction. The insulating insulator may disposed on the side surface of the stator core. The linear coil may be wound around the side surface of the stator core, with the insulating insulator interposed therebetween. Further, the insulator may include a central member and an outer member. The central member may cover the stator core. The outer member may be connected to an outside of the central member in the axial direction of the stator core. The outer member may have a wall surface substantially parallel to a direction in which the central member and the outer member are arranged, and a groove recessed in a direction orthogonal to the wall surface.

A transducer may include the stator for converting between electrical energy and mechanical energy, and a connection terminal of the busbar and an end portion of the coil may be fitted into the groove. Accordingly, a positional relationship between the connection terminal of the busbar and the end portion of the coil may be easily fixed.

Additional advantages and novel features of the system of the present disclosure will be set forth in part in the description that follows, and in part will become more apparent to those skilled in the art upon examination of the following or upon learning by practice of the disclosure.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a preferred mode of use, further features and advances thereof, will be understood by reference to the following detailed description of illustrative implementations of the disclosure when read in conjunction with reference to the accompanying drawings, wherein.

DETAILED DESCRIPTION

Figure 1:
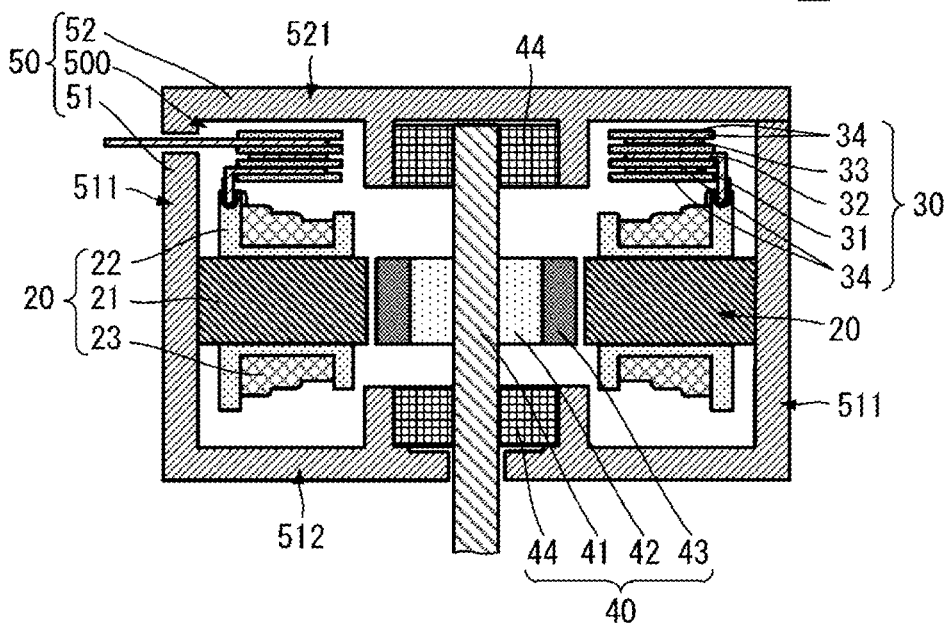
FIG. 1 is a cross-sectional view illustrating a schematic configuration of a motor in accordance with aspects of the present disclosure.
Figure 2:
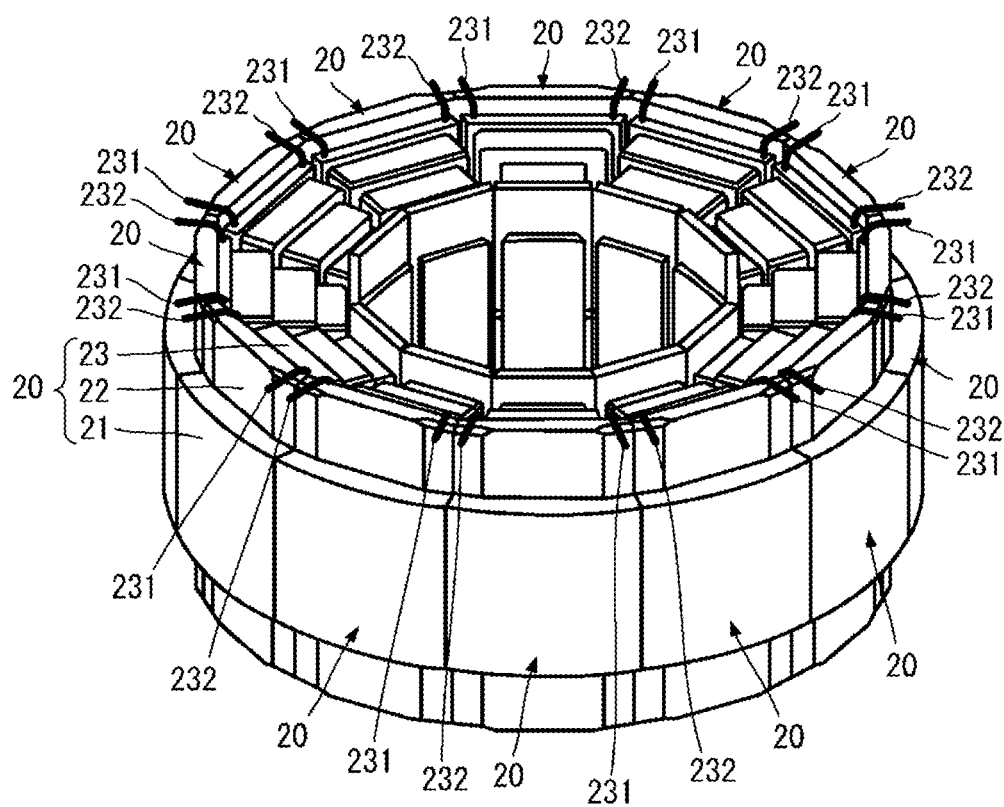
FIG. 2 is a perspective view of a stator assembly in accordance with aspects of the present disclosure.

A stator, a stator assembly, and a motor according to an aspect of the present invention will be described with reference to the drawings. FIG. 1 is a cross-sectional view illustrating a schematic configuration of the motor according to an aspect of the disclosure. FIG. 2 is a perspective view of the stator assembly. Although the motor may be described as a transducer for converting between electrical energy and mechanical energy, a generator may also be implemented. For example, the transducer for converting between electrical energy and mechanical energy may be a transducer converting from electrical energy to mechanical energy, or a transducer converting from mechanical energy to electrical energy.

As illustrated in FIG. 1, a motor 10 includes stator members 20, a busbar member 30, a rotor member 40, and a housing 50. A plurality of the stator members 20 are illustrated. The stator member 20, may also be referred to interchangeably herein as a "stator."

The housing 50 may be provided with a first member 51 and a second member 52. The first member 51 may have a first wall 511 having a cylindrical shape, and a planar second wall 512 that closes one end of the cylindrical shape. The first member 51 may have a substantially cylindrical box shape having an opening. The second member 52 may have a substantially plate-like shape. The second member 52 may have a planar third wall 521. The second member 52 may be disposed so as to close the opening of the first member 51. Thus, the housing 50 may have a space 500 which is substantially shielded from an outside by the first wall 511, the second wall 512, and the third wall 521. The first member 51 and the second member 52 may be constructed of a material having high rigidity.

The stator members 20, the busbar member 30, and the rotor member 40 may be disposed in the space 500 formed by the housing 50. The rotor member 40 may be disposed at a substantially central position in plan view of the third wall 521 and the second wall 512. For example, the rotor member 40 may be disposed in a central region of a predetermined size, including a central axis of a substantially cylindrical shape, formed by the first wall 511. In this case, an axial direction of the rotor member 40 may coincide with, or be parallel to, an axial direction of a substantially cylindrical shape formed by the plurality of stator members 20.

As illustrated in FIG. 1, the plurality of stator members 20 are disposed between the substantially cylindrical wall 511 of the housing 50 and the rotor member 40. As illustrated in FIG. 2, the stator members 20 are disposed at equal distances along a circumferential direction of the cylindrical shape. The stator members 20 may be adjacent to each other at an end portion in a width direction. The stator assembly may be constituted by the plurality of stator members 20 arranged circumferentially in this way.

As illustrated in FIG. 1, the busbar member 30 is disposed to be adjacent to the plurality of stator members 20 in an axial direction of the housing 50. The busbar member 30 may be connected to the stator member 20 by a connection pattern, as described below. The busbar member 30 may be provided with a busbar output terminal. Part of the busbar output terminal may be exposed outside the housing 50.

The rotor member 40 may include a shaft 41, a rotor yoke 42, a magnet 43, and bearings 44. The shaft 41 may be rod-shaped and be constructed with high rigidity. A direction in which an axis of the shaft 41 extends coincides with an axis of an annular shape formed by the plurality of stator members 20, and is orthogonal to an opening surface at a center of the stator assembly. The shaft 41 may be installed in the housing 50 with the bearings 44 interposed therebetween. The rotor yoke 42 may be disposed on an outer main surface of the shaft 41. The magnet 43 may be disposed on an outer main surface of the rotor yoke 42.

Figure 3A:
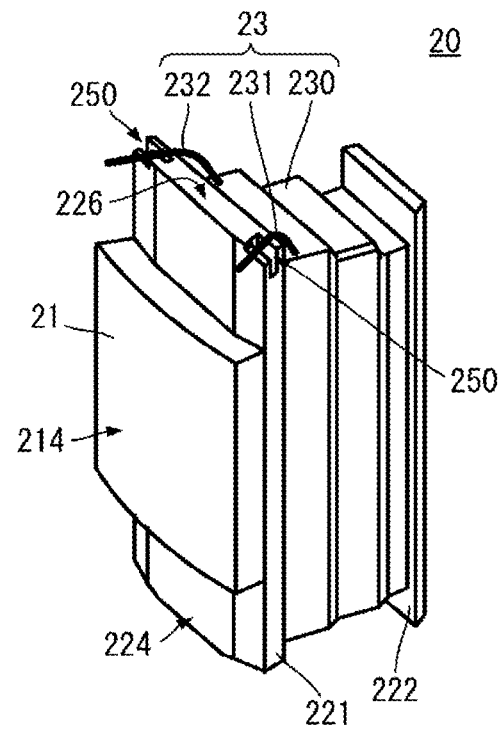
FIG. 3A is a perspective view of a stator member in accordance with aspects of the present disclosure.
Figure 3B:
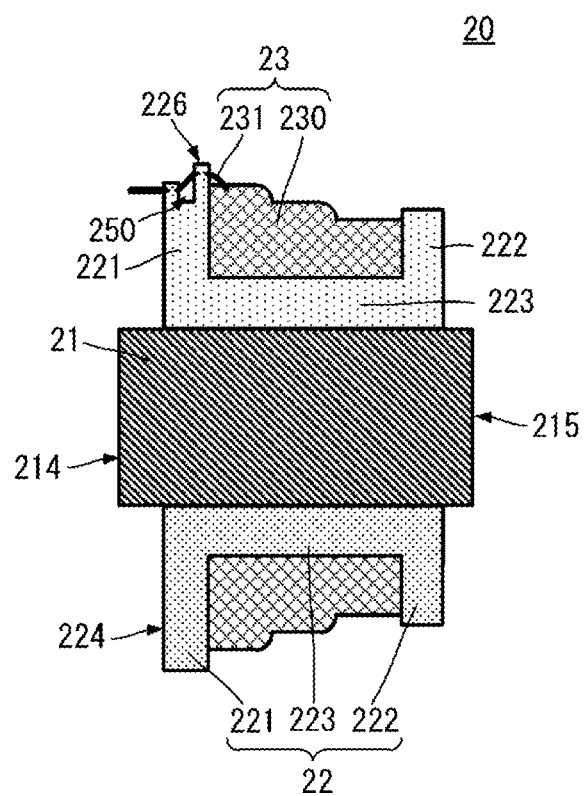
FIG. 3B is a cross-sectional view illustrating a schematic configuration of the stator member in accordance with aspects of the present disclosure.
Figure 4A:
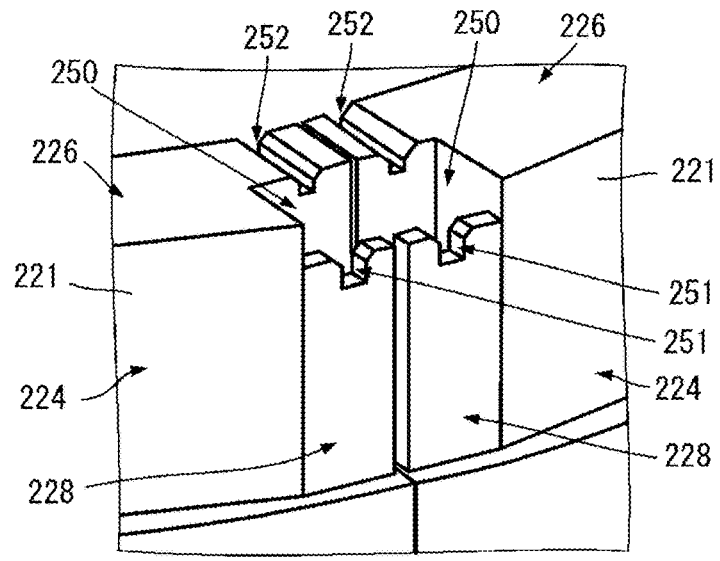
FIG. 4A is a partial enlarged view of insulators in accordance with aspects of the present disclosure.
Figure 4B:
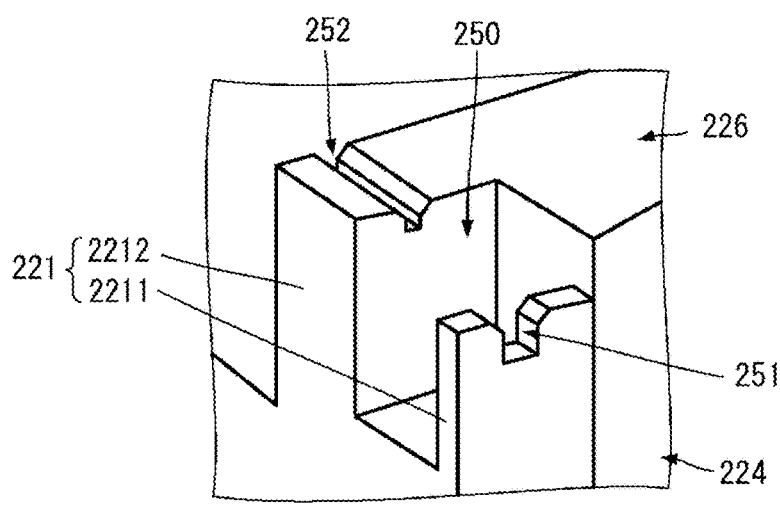
FIG. 4B is a partial enlarged view of an insulator in accordance with aspects of the present disclosure.

FIG. 3A is a perspective view of the stator member, and FIG. 3B is a cross-sectional view illustrating a schematic configuration of the stator member. FIG. 4A is a partial enlarged view of insulators and FIG. 4B is a partial enlarged view of an insulator. FIG. 4B is a diagram in which one of the adjacent insulators in FIG. 4A is omitted.

As described above, the stator members 20 may be disposed circumferentially. The stator members 20 arranged circumferentially as described above, may constitute a stator assembly having an annular shape. The width direction, an axial direction, and a height direction of the stator members 20 are defined below.

The width direction of the stator member 20 may be a direction parallel to a direction in which the plurality of stator members 20 is arranged in the stator assembly. The axial direction of the stator member 20 may be a direction extending radially from a center of the stator assembly constituted by the stator members 20 (radial direction of a circle implemented by the stator assembly). The height direction of the stator member 20 may be a direction orthogonal to the width direction and the axial direction of the stator member 20.

The stator member 20 may include a stator core 21, an insulator 22, and a coil 23. As illustrated in FIG. 3A and FIG. 3B, the stator core 21 has a substantially columnar shape. The stator core 21 may be constructed of a magnetic material. The stator core 21 may have an outer end surface 214 and an inner end surface 215. The inner end surface 215 of the stator core 21 and the magnet 43 are opposed to each other.

The insulator 22 has insulating properties. The insulator 22 may be formed of, for example, an insulating resin. The insulator 22 may include an outer member 221, an inner member 222, and a central member 223. The central member 223 may have a substantially cylindrical shape. The outer member 221 may be connected to one end of the central member 223 in an extending direction. The inner member 222 may be connected to another end of the central member 223 in the extending direction. When viewed in an axial direction of the central member 223, areas of the outer member 221 and the inner member 222 may be larger than an area of an outer shape of the central member 223. The insulator 22 may be divided into two members, that is, an upper member and a lower member (not labeled), that cover the stator core 21 by the upper member and the lower member. Accordingly, the central member 223 as the upper member and the central member 223 as the lower member may each have a substantially semicircular cross section.

The central member 223 may substantially cover the entire outer main surface of a central portion of the stator core 21. The outer member 221 may be disposed in a vicinity of an outer end portion of the stator core 21, and the inner member 222 may be disposed in a vicinity of an inner end portion of the stator core 21. With this configuration, the outer end surface 214 of the stator core 21 is not covered by the insulator 22, and the inner end surface 215 of the stator core 21 is not covered by the insulator 22.

As illustrated in FIG. 3A, FIG. 3B, FIG. 4A and FIG. 4B, the outer member 221 includes a surface 226 that is orthogonal to the outer end surface 214 and parallel to the axial direction of the stator member 20. The surface 226 has a groove 250.

The groove 250 may have a shape recessed from the surface 226. The grooves 250 may be formed at both ends of the outer member 221 in the width direction of the stator member 20. The grooves 250 may also open to both end surfaces of the outer member 221 in the width direction of the stator member 20. Shapes of the grooves 250 at the both ends may be substantially the same.

A depth of the groove 250 may be, for example, approximately a total value of a length of a second portion 3112 in a connection terminal 311 of a first busbar 31 closest to the stator member 20 in a busbar member described later, and a diameter of a coil end portion. The depth of the groove 250 may be equal to or larger than the total value of the length of the second portion 3112 in the connection terminal 311 of the first busbar 31 and the diameter of the coil end portion. A length of the groove 250 in the axial direction of the stator member 20 may be approximately a total value of a thickness of the second portion in the connection terminal of the busbar member, as described below, and twice the diameter of the coil end portion, and the length may be equal to or larger than the total value. A length of the groove 250 in the width direction of the stator member 20 may be approximately half a width of the connection terminal of the busbar member, as described below.

The outer member 221 may have a first wall 2211 and a second wall 2212 that are outer sides of the groove 250. The first wall 2211 may be lower than the second wall 2212. An upper end surface of the second wall 2212 may be flush with the surface 226.

An upper end surface of the first wall 2211 may be provided with a recess 251. The recess 251 may have a shape that is recessed from the upper end surface. The recess 251 passes through the first wall 2211 in a thickness direction (axial direction). A width of the recess 251 (a length parallel to a width direction of the outer member 221) may be equal to or larger than the diameter of the coil end portion of the coil 23. A depth of the recess 251 (a length parallel to a height direction of the outer member 221) may be equal to or larger than the diameter of the coil end portion. Alternatively, the recess 251 may be omitted.

The upper end surface of the second wall 2212 may be provided with a recess 252. The recess 252 has a shape that is recessed from the upper end surface. The recess 252 passes through the second wall 2212 in a thickness direction (axial direction). A width of the recess 252 (a length parallel to the width direction of the outer member 221) may be equal to or larger than the diameter of the coil end portion of the coil 23. A depth of the recess 252 (a length parallel to the height direction of the outer member 221) may be equal to or larger than the diameter of the coil end portion. Alternatively, the recess 252 may be omitted.

A surface of the second wall 2212 on a side of the groove 250 may be a flat surface, and be substantially orthogonal to the axial direction of the stator member 20. When the plurality of stator members 20 are arranged, the second walls 2212 of the stator members 20 adjacent to each other may be flush with each other.

A region in an end portion in the width direction of the outer member 221 may be recessed inward from a central region in the width direction. For example, an outer end surface 228 in the region of the end portion in the width direction of the outer member 221 may be inclined inward with respect to the outer end surface 224 in the central region in the width direction. In one aspect of the disclosure, with respect to an end on a side of the central region in the region of the end portion, an end on an opposite side to the side connected to the central region in the region of the end portion may be located inside the stator member 20. With this configuration, the insulator 22 may be reduced in size. Further, the stator member 20 may be be reduced in size.

The coil 23 may be made of a linear conductor. The coil 23 may include a main conductor 230, a coil end portion 231, and a coil end portion 232. The coil end portion 231 is one end of the main conductor 230, and the coil end portion 232 is another end of the main conductor 230. The coil end portion 231 and the coil end portion 232 each corresponds to the "end portion of the coil" of the present disclosure.

The main conductor 230 may be covered with an insulating film. The coil end portion 231 and the coil end portion 232 may not be covered by the insulating film. The main conductor 230 may be wound around the central member 223 of the insulator 22. The main conductor 230 may be disposed in a region surrounded by an outer peripheral surface of the central member 223, a wall surface not overlapping with the central member 223 on a side connected to the central member 223 in the outer member 221, and a wall surface not overlapping with the central member 223 on a side connected to the central member 223 in the inner member 222 in the insulator 22.

The coil end portion 231 and the coil end portion 232 are guided outside from a side of the outer member 221 of the insulator 22. For example, the coil end portion 231 may be inserted into the recess 252 and the recess 251, and is guided outside the outer end surface 228. Similarly, the coil end portion 232 may be inserted into the recess 252 and the recess 251, and is guided outside the outer end surface 228.

With this configuration, in a first stator member 20 and a second stator member 20 adjacent to each other in the arranged stator members, the coil end portion 231 of the first stator member 20 and the coil end portion 232 of the second stator member 20 may be proximate along a direction in which the stator members 20 are arranged.

The connection terminal of the busbar member 30, as described below, is disposed in this portion (for example, see FIG. 8 and FIG. 9). Thus, the coil end portion 231 and the coil end portion 232 may be securely guided to a position where the connection terminal is disposed. Thus, joining the coil end portion 231 and the coil end portion 232 and the connection terminal of the busbar member 30 is facilitated.

Further, as will be described below, by inserting the connection terminal of the busbar member 30 into the groove 250, the busbar member 30 may be easily positioned on and fixed to the stator assembly, and further, the busbar member 30 and the coil 23 are easily connected to each other.

Figure 5:
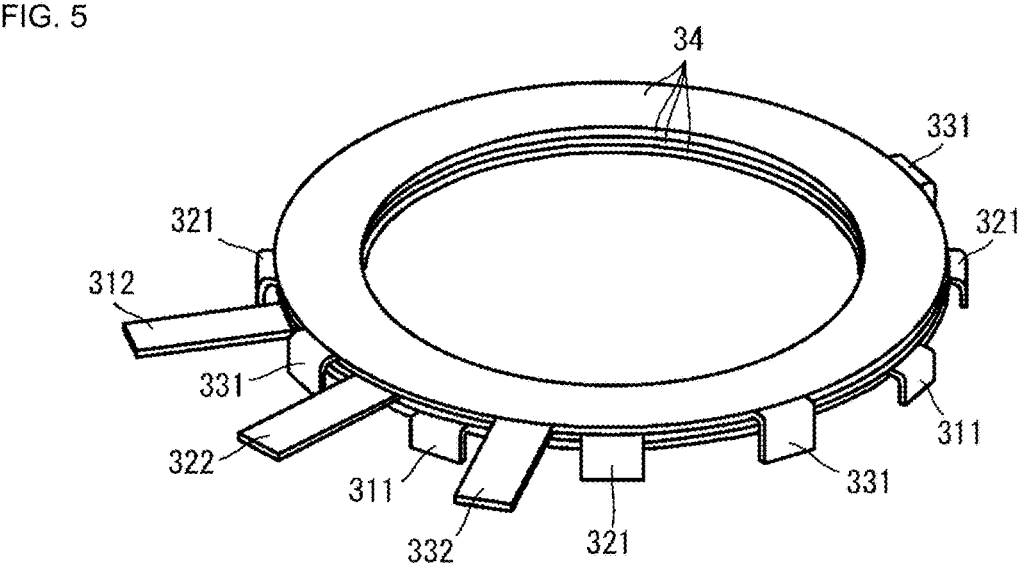
FIG. 5 is an external perspective view of a busbar member in accordance with aspects of the present disclosure.
Figure 6:
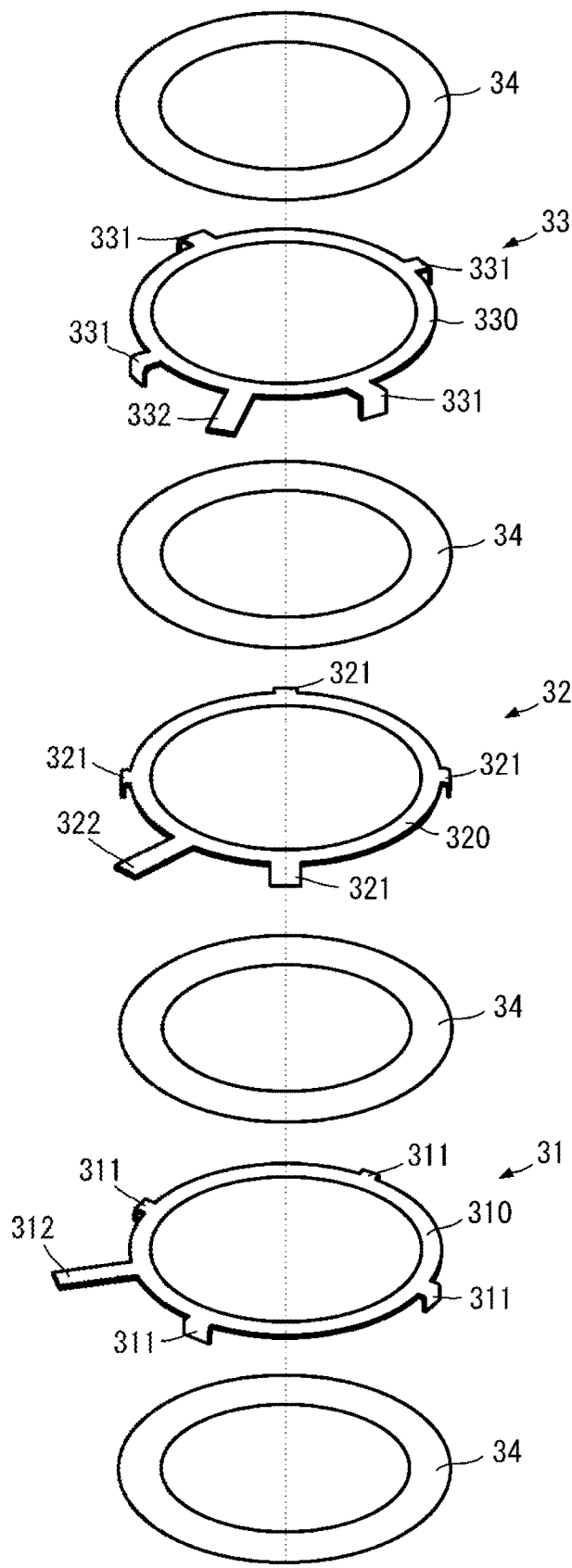
FIG. 6 is an exploded perspective view of the busbar member in accordance with aspects of the present disclosure.
Figure 7A:
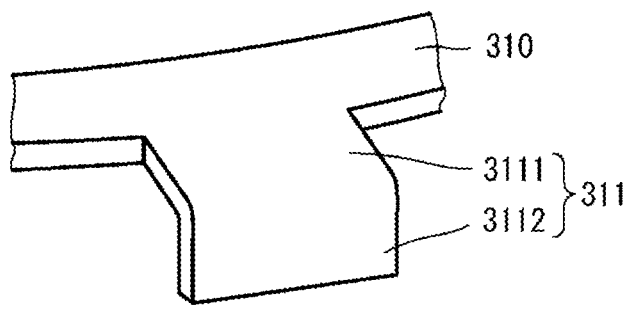
FIG. 7A is a perspective view in which a busbar terminal is enlarged in accordance with aspects of the present disclosure.
Figure 7B:
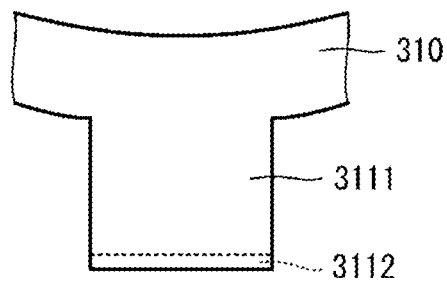
FIG. 7B is a plan view in which the busbar terminal is enlarged in accordance with aspects of the present disclosure.
Figure 7C:
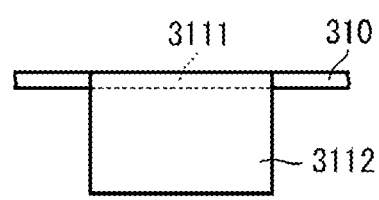
FIG. 7C is a first side view in which the busbar terminal is enlarged in accordance with aspects of the present disclosure.
Figure 7D:
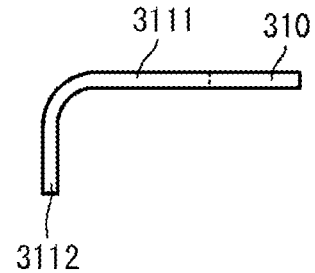
FIG. 7D is a second side view in which the busbar terminal is enlarged in accordance with aspects of the present disclosure.

FIG. 5 is an external perspective view of a busbar member according to an aspect of the disclosure. FIG. 6 is an exploded perspective view of the busbar member according to an aspect of the disclosure. FIG. 7A is a perspective view in which a busbar terminal is enlarged according to an aspect of the disclosure. FIG. 7B is a plan view in which the busbar terminal is enlarged. FIG. 7C is a first side view in which the busbar terminal is enlarged, and FIG. 7D is a second side view in which the busbar terminal is enlarged.

As illustrated in FIG. 5 and FIG. 6, the busbar member 30 includes the first busbar 31, a second busbar 32, a third busbar 33, and a plurality of insulating layers 34. Each of the first busbar 31, the second busbar 32, and the third busbar 33 are plate-like and electrically conductive. Alternatively, each of the first busbar 31, the second busbar 32, and the third busbar 33 may be linear. Accordingly, each of the first busbar 31, the second busbar 32 and the third busbar 33 may be thin and able to flow a large current.

The first busbar 31, the second busbar 32, the third busbar 33, and the insulating layers 34 are stacked in order of the insulating layer 34, the first busbar 31, the insulating layer 34, the second busbar 32, the insulating layer 34, the third busbar 33, and the insulating layer 34. It is also possible to omit the insulating layers 34 at both ends in a stacking direction, as far as insulation from the housing 50 or the like is secured.

The first busbar 31 may include a base portion 310, a plurality of connection terminals 311, and an output terminal 312. The base portion 310 has an annular shape. The connection terminals 311 may be disposed at equal distances along a circumferential direction of the base portion 310. As illustrated in FIG. 5 and FIG. 6, for example, the connection terminals 311 may be disposed at an angular distance of approximately 90° along the circumferential direction. Each of the plurality of connection terminals 311 has a shape protruding outward from an outer periphery of the base portion 310. Each of the plurality of connection terminals 311 has a width along the circumferential direction of the base portion 310. This width corresponds to a distance between the coil end portion 231 and the coil end portion 232 adjacent to each other in the above adjacent stator members 20. The output terminal 312 has a shape protruding outward from the outer periphery of the base portion 310. The output terminal 312 may be connected to the base portion 310 at a position different from a connection position of each of the plurality of connection terminals 311 in the circumferential direction of the base portion 310.

Each of the plurality of connection terminals 311 may be bent halfway in a longitudinal direction orthogonal to a width direction. For example, as illustrated in FIG. 7A, FIG. 7B FIG. 7C, and FIG. 7D, each of the plurality of connection terminals 311 includes a first portion 3111 and the second portion 3112. The first portion 3111 is connected to the base portion 310. An end portion of the first portion 3111 on an opposite side to a connection end portion to the base portion 310 is connected to the second portion 3112.

The first portion 3111 may be substantially flush with the base portion 310. For example, a main surface of the base portion 310 and a main surface of the first portion 3111 may be connected to each other on the same plane. The second portion 3112 may be orthogonal to the first portion 3111. That is, a main surface of the second portion 3112 and the main surface of the first portion 3111 may be substantially orthogonal to each other.

Bending directions of the connection terminals 311 may be the same. For example, the second portions 3112 of the connection terminals 311 protrude in the same direction with respect to the base portion 310.

The second busbar 32 may include a base portion 320, a plurality of connection terminals 321, and an output terminal 322. The second busbar 32 may have structure similar to that of the first busbar 31. In one aspect of the disclosure, the base portion 320 of the second busbar 32 may be similar to the base portion 310 of the first busbar 31. The plurality of connection terminals 321 of the second busbar 32 may be similar to the plurality of connection terminals 311 of the first busbar 31. However, a portion extending in a direction orthogonal to the base portion 320 in each of the plurality of connection terminals 321 may be longer than the portion extending in the direction orthogonal to the base portion 310 in each of the plurality of connection terminals 311. The output terminal 322 of the second busbar 32 may be similar to the output terminal 312 of the first busbar 31.

The third busbar 33 may include a base portion 330, a plurality of connection terminals 331, and an output terminal 332. The third busbar 33 may have structure similar to that of the first busbar 31. In one aspect of the disclosure, the base portion 330 of the third busbar 33 may be similar to the base portion 310 of the first busbar 31. The plurality of connection terminals 331 of the third busbar 33 may be similar to the plurality of connection terminals 311 of the first busbar 31. However, a portion extending in a direction orthogonal to the base portion 330 in each of the plurality of connection terminals 331 may be longer than the portion extending in the direction orthogonal to the base portion 310 in each the plurality of connection terminals 311, and the portion extending in the direction orthogonal to the base portion 320 in each of the plurality of connection terminals 321. The output terminal 332 of the third busbar 33 may be similar to the output terminal 312 of the first busbar 31.

The base portion 310 of the first busbar 31, the base portion 320 of the second busbar 32, and the base portion 330 of the third busbar 33 overlap with each other when viewed in a stacking direction.

Respective connection terminals of the first busbar 31, the second busbar 32, and the third busbar 33 do not overlap with each other. In one aspect of the disclosure, the connection terminals 311 of the first busbar 31, the connection terminals 321 of the second busbar 32, and the connection terminals 331 of the third busbar 33 are disposed at equal distances in a circumferential direction of a circle where the base portion 310, the base portion 320, and the base portion 330 overlap with each other. The connection terminals 311, the connection terminals 321 of the second busbar 32, and the connection terminals 331 of the third busbar 33 are disposed in order in the circumferential direction.

The insulating layer 34 may have an annular shape. The insulating layer 34 may be made of insulating paper. The insulating layer 34 may be thinner than the first busbar 31, the second busbar 32, and the third busbar 33. The insulating layers 34 are disposed at least between the base portion 310 of the first busbar 31 and the base portion 320 of the second busbar 32, and between the base portion 320 of the second busbar 32 and the base portion 330 of the third busbar 33. By these insulating layers 34, the busbar member 30 ensures insulation between the first busbar 31 and the second busbar 32, and insulation between the second busbar 32 and the third busbar 33.

In one aspect of the disclosure, in FIG. 5 and FIG. 6, each of the base portion 310, the base portion 320, and the base portion 330 are annular, but is not limited to be annular as long as the base portion is looped. Alternatively, in FIG. 5 and FIG. 6, although the base portion 310, the base portion 320, and the base portion 330 each have a structure in which there are no cuts in the circumferential direction, there may be the cuts.

Figure 8:
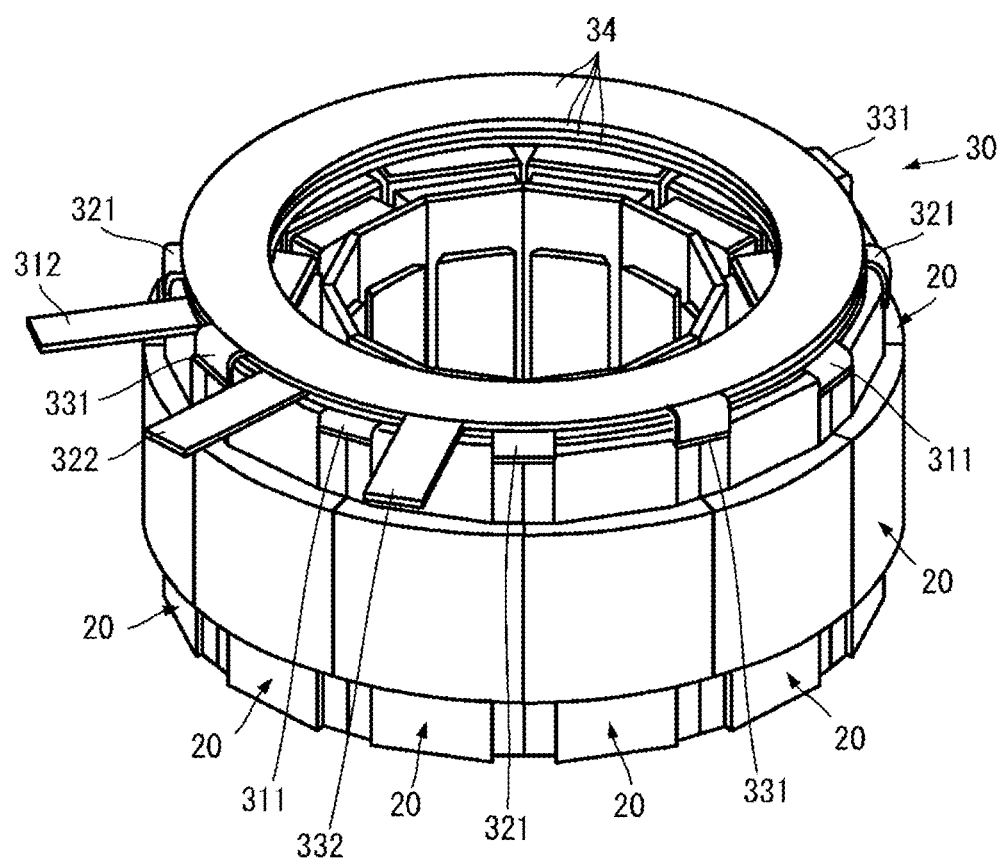
FIG. 8 is a perspective view illustrating a positional relationship between the stator assembly and the busbar member in accordance with aspects of the present disclosure.
Figure 9A:
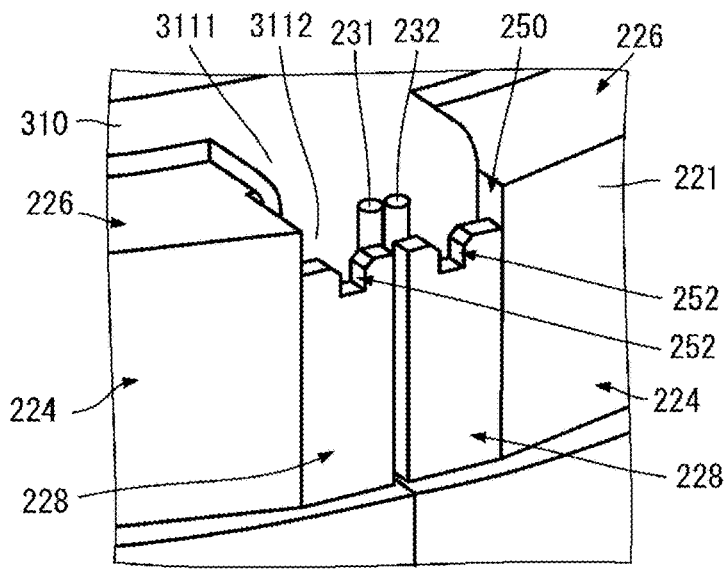
FIG. 9A is an enlarged view illustrating a state in which the busbar terminal is fitted into a groove of the insulator in accordance with aspects of the present disclosure.
Figure 9B:
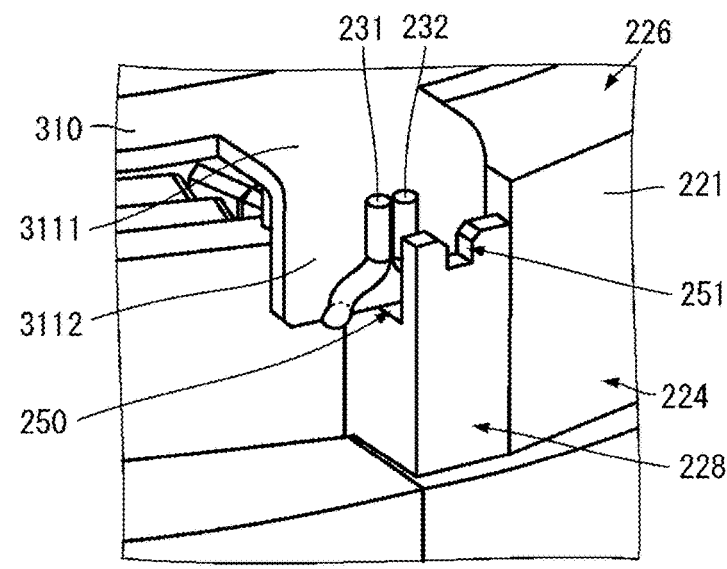
FIG. 9B is an enlarged view illustrating a state in which the busbar terminal is fitted into a groove of the insulator in accordance with aspects of the present disclosure.
Figure 9C:
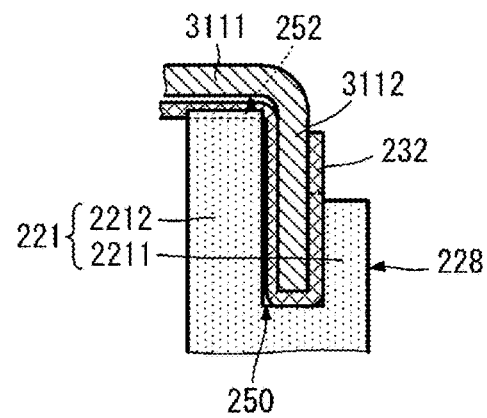
FIG. 9C is a side sectional view in accordance with aspects of the present disclosure.

FIG. 8 is a perspective view illustrating a positional relationship between the plurality of stator members and the busbar member according to an aspect of the disclosure. FIG. 9A and FIG. 9B are enlarged views each illustrating a state in which the insulator of the stator member and the connection terminal of the busbar member are fitted to each other according to an aspect of the disclosure, and FIG. 9C is a cross-sectional view of a fitting portion.

As illustrated in FIG. 8, the busbar member 30 is disposed with respect to the plurality of stator members 20 such that the second portion 3112 of the connection terminal 311, the second portion of the connection terminal 321, and the second portion of the connection terminal 331 are on a side of the stator members 20. Further, each of the connection terminal 311, the connection terminal 321, and the connection terminal 331 are disposed so as to overlap with respective opposed portions of the adjacent stator members 20.

In this position, as described above, the respective grooves 250 of the adjacent stator members 20 are disposed. As illustrated in FIG. 9A, FIG. 9B, and FIG. 9C, each of the second portion 3112 of the connection terminal 311, the second portion of the connection terminal 321, and the second portion of the connection terminal 331 are inserted into the groove 250. Alternatively, FIG. 9B is a diagram illustrating a state in which one of the insulators in the adjacent stator members in FIG. 9A is removed.

Each of the second portions may be inserted into the groove 250 with the coil end portion 231 and the coil end portion 232 caught therein. In one aspect of the disclosure, the coil end portion 231 and the coil end portion 232 may be disposed within the groove 250 along an inner wall surface of the second portion, a wall surface at a tip of the second portion, and an outer wall surface of the second portion.

Accordingly, each of the second portions, for example, each of the connection terminals, may be fixed to the insulator 22 in a state of being in contact with the coil end portion 231 and the coil end portion 232.

In this state, the coil end portion 231 and the coil end portion 232 may be fixed to the second portion by fusing, soldering, laser welding, or the like. Thus, the coil end portion 231 and the coil end portion 232, and each of the connection terminal 311, the connection terminal 321, and the connection terminal 331 are joined together.

Thus, the busbar member and the coils are easily and reliably connected.

In one aspect of the disclosure, before the connection terminal is inserted into the groove 250, each of the coil end portion 231 and the coil end portion 232 may be disposed in a position of overlapping with an opening of the groove 250, by the recess 251 and the recess 252. Thus, by inserting the connection terminal from the opening into the groove 250, the coil end portion 231 and the coil end portion 232 are guided into the groove 250, and are fixed in the groove 250 together with the connection terminal. Thus, positioning for joining the connection terminal of the busbar member and the coil end portions is further facilitated.

In addition, a surface of the second wall 2212 forming the groove 250 (inner wall surface of the groove 250) may be flat. Thus, the second portion of the planar connection terminal may be inserted into the groove 250 easily and in a stable state.

In one aspect of the disclosure, a surface of the first wall 2211 forming the groove 250 (inner wall surface of the groove 250) may be flat and opposed to the surface of the second wall 2212. Accordingly, the groove 250 may have a rectangular cross section in which the surface of the first wall and the surface of the second wall are opposed to each other in parallel (see FIG. 9C). The length of the groove 250 in the axial direction of the stator member 20 is, as described above, approximately the total value of the thickness of the second portion in the connection terminal of the busbar member and twice the diameter of the coil end portion. Thus, since the second portion of the planar connection terminal is inserted into the groove 250 with the coil end portions caught therein, the coil end portions are brought into a state of being proximate to or in close contact with an outer surface of the second portion of the connection terminal inserted into the groove 250, so that the coil end portions and the connection terminal can be easily joined.

In addition, according to an aspect of the disclosure, the outer first wall 2211 of the groove 250 may be lower than the inner second wall 2212. Accordingly, as illustrated in FIG. 9A, a portion of each of the coil end portion 231 and the coil end portion 232 having a predetermined length at a tip is exposed to an outside. Thus, the coil end portion 231 and the coil end portion 232 and the connection terminal may be be easily joined to each other from the outside by using this portion.

Figure 10:
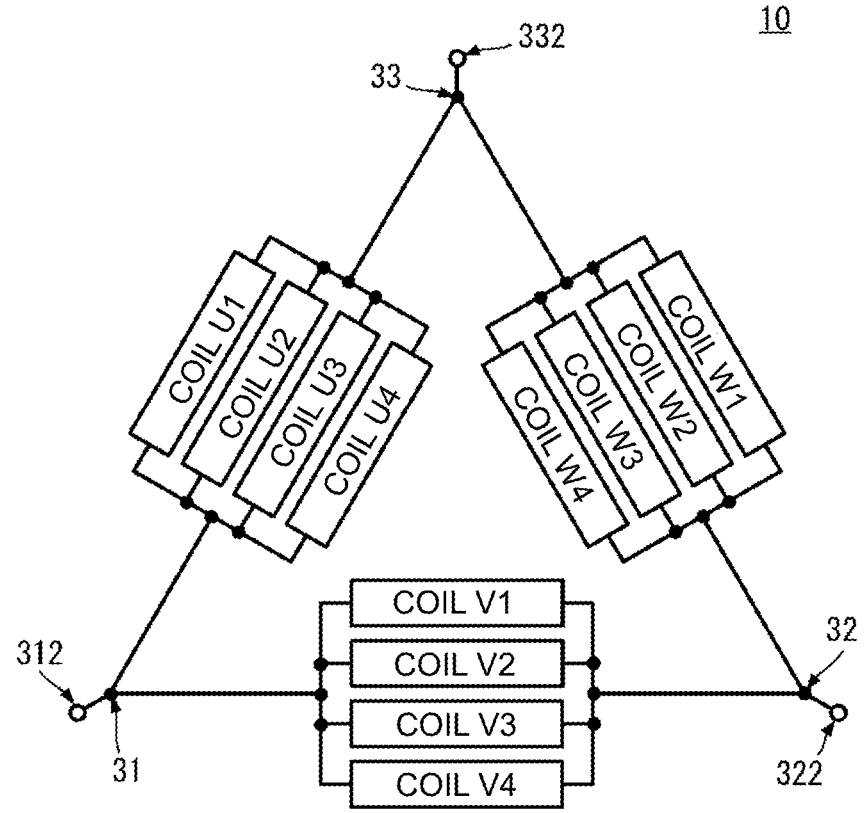
FIG. 10 is an equivalent circuit diagram of the motor in accordance with aspects of the present disclosure.

In accordance with the structure described above, the motor 10 having a circuit configuration illustrated in FIG. 10 may be implemented. FIG. 10 is an equivalent circuit diagram of the motor according to the embodiment.

As illustrated in FIG. 10, the motor 10 includes a U-phase coil, a V-phase coil, and a W-phase coil. The U-phase coil has a circuit configuration in which a coil U1, a coil U2, a coil U3, and a coil U4 are connected in parallel. The V-phase coil has a circuit configuration in which a coil V1, a coil V2, a coil V3, and a coil V4 are connected in parallel. The W-phase coil has a circuit configuration in which a coil W1, a coil W2, a coil W3, and a coil W4 are connected in parallel to each other.

One end of the U-phase coil is connected to one end of the V-phase coil. Another end of the V-phase coil is connected to one end of the W-phase coil. Another end of the W-phase coil is connected to another end of the U-phase coil. That is, the U-phase coil, the V-phase coil, and the W-phase coil are connected to each other in delta connection.

Each of the coils U1, U2, U3, U4, V1, V2, V3, V4, W1, W2, W3, and W4 may be implemented by the stator member 20 described above. A connecting portion connecting the U-phase coil and the V-phase coil may be implemented by, for example, the first busbar 31, as described above. A connection portion connecting the V-phase coil and the W-phase coil may be implemented by, for example, the second busbar 32, as described above. A connection portion connecting the W-phase coil and the U-phase coil may be implemented by, for example, the third busbar 33, as described above. Three output sections in the delta connection may be implemented by the output terminal 312 of the first busbar 31, the output terminal 322 of the second busbar 32, and the output terminal 332 of the third busbar 33.

Figure 11A:
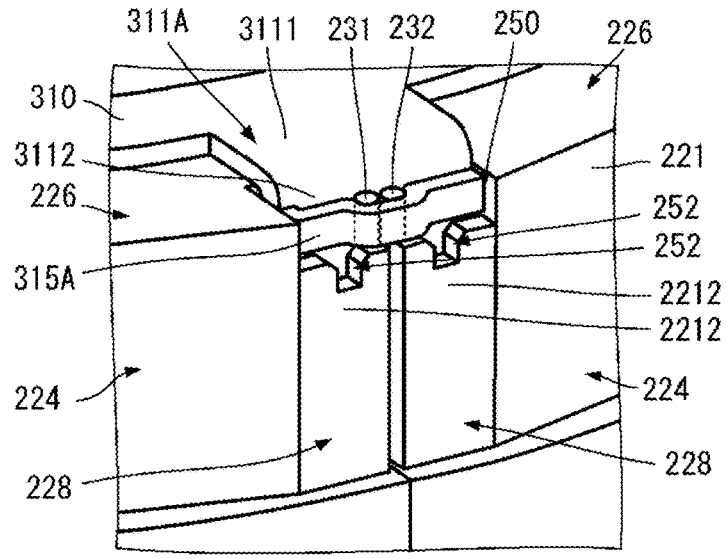
FIG. 11A is an enlarged view illustrating a connection terminal of the busbar member in accordance with aspects of the present disclosure.
Figure 11B:
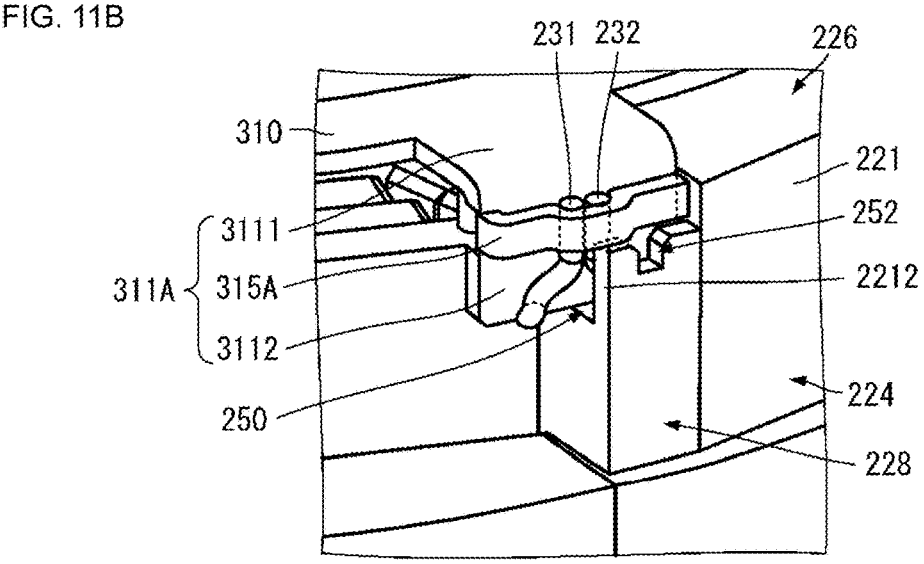
FIG. 11B is an enlarged view illustrating a connection terminal of the busbar member in accordance with aspects of the present disclosure.
Figure 11C:
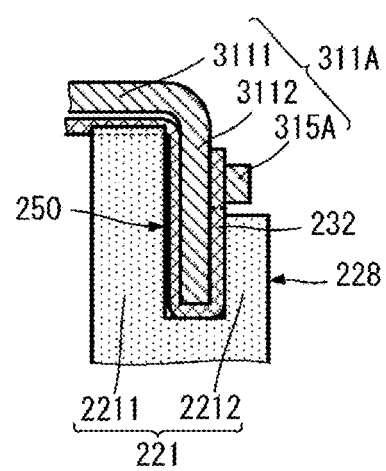
FIG. 11C is a side sectional view in accordance with aspects of the present disclosure.

FIG. 11A and FIG. 11B are enlarged views illustrating another aspect of the connection terminal of the busbar member, and FIG. 11C is a side sectional view. Alternatively, FIG. 11B is a diagram illustrating a state in which one insulator in adjacent stator members in FIG. 11A is removed.

A connection terminal 311A illustrated in FIG. 11A, FIG. 11B, and FIG. 11C is different in that a tongue portion 315A is added to the connection terminal 311 described above. The rest of configurations of the connection terminal 311A may be similar to that of the connection terminal 311, and a description of similar portions will not be repeated. Further, although the connection terminal 311A of the first busbar 31 is described as an example, respective connection terminals of the other second busbar 32 and third busbar 33 have similar structure, and a description thereof will not be repeated.

As illustrated in FIG. 11A, FIG. 11B, and FIG. 11C, the connection terminal 311A may include the first portion 3111, the second portion 3112, and the tongue portion 315A. The tongue portion 315A may have a belt-like shape. One end of the tongue portion 315A is connected to a side surface of the second portion 3112.

The tongue portion 315A may be positioned so as to sandwich the coil end portion 231 and the coil end portion 232, together with the second portion 3112. The tongue portion 315A sandwiches such that the coil end portion 231 and the coil end portion 232 are adjacent to and in contact with each other. This can be implemented, for example, by forming a recess in which two coil end portions can be accommodated, at a position halfway in a direction in which the tongue portion 315A extends.

With the above configuration, the coil end portion 231 and the coil end portion 232 are more securely connected to the connection terminal 311A.

Figure 12:
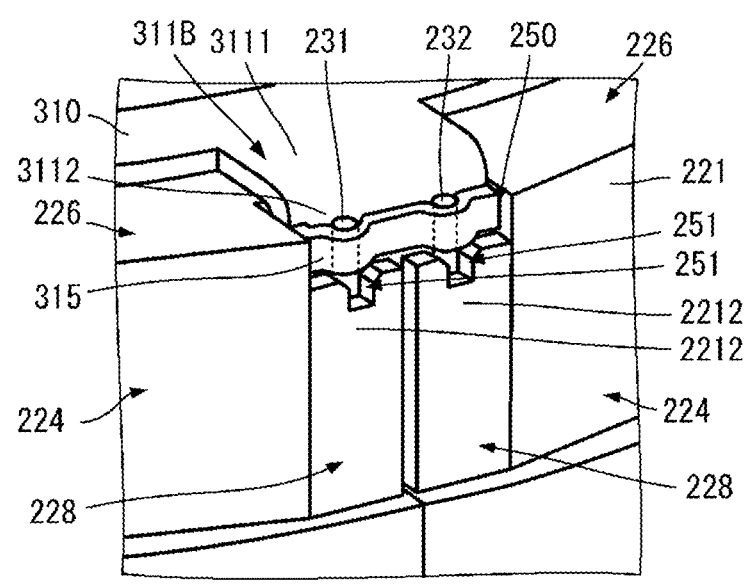
FIG. 12 is an enlarged view illustrating the connection terminal of the busbar member in accordance with aspects of the present disclosure.

FIG. 12 is an enlarged view illustrating another aspect of the connection terminal of the busbar member. A connection terminal 311B illustrated in FIG. 12 may be different in a shape of a tongue portion 315B from the connection terminal 311A, as described above. The rest of configurations of the connection terminal 311B may be similar to that of the connection terminal 311A, and a description of similar portions will not be repeated.

The connection terminal 311B illustrated in FIG. 12 may include the first portion 3111, the second portion 3112, and the tongue portion 315B. The tongue portion 315B may have a belt-like shape. One end of the tongue portion 315B may be connected to a side surface of the second portion 3112.

The tongue portion 315B may be positioned so as to sandwich the coil end portion 231 and the coil end portion 232, together with the second portion 3112. The tongue portion 315B sandwiches the coil end portion 231 and the coil end portion 232 individually and in a separated state. This can be implemented, for example, by forming two recesses that each can accommodate one coil end portion, separated from each other, at respective positions halfway in a direction in which the tongue portion 315B extends. A distance between the recesses in the tongue portion 315B is desirably distances between the first recesses 251 and between the second recesses 252 of the outer members 221.

With the above configuration, the coil end portion 231 and the coil end portion 232 are more securely connected to the connection terminal 311B.

Figure 13:
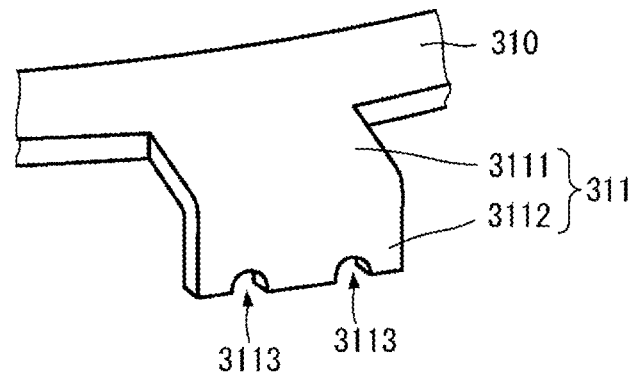
FIG. 13 is an enlarged view illustrating the connection terminal of the busbar member in accordance with aspects of the present disclosure.

FIG. 13 is an enlarged view illustrating another aspect of the connection terminal of the busbar member. The connection terminal 311 illustrated in FIG. 13 has structure different from that of the connection terminal 311 described above in that recesses 3113 for guiding the coil end portion 231 and the coil end portion 232 respectively are added.

The recesses 3113 may be formed at a tip of the second portion 3112, that is, at an end portion of the second portion 3112 on an opposite side of a side connected to the first portion 3111. Two recesses 3113 are present, and the two recesses 3113 may be disposed with a distance therebetween in a width direction of the second portion 3112. The distance between the two recesses 3113 are desirably distances between the first recesses 251 and between the second recesses 252 of the outer member 221.

With the above configuration, when the second portion 3112 of the connection terminal 311 is inserted into the groove 250, the coil end portion 231 and the coil end portion 232 are inserted into the groove 250 in a state of being fitted in the respective recesses 3113. Accordingly, the coil end portion 231 and the coil end portion 232 are easily guided to respective designated positions in the groove 250.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A stator comprising:
   a stator core configured to have a shape extending along an axial direction and having a side surface extending in the axial direction;
   an insulator disposed on the side surface of the stator core; and
   a coil having a linear shape and wound around the side surface of the stator core with the insulator interposed therebetween,
   wherein the insulator comprises a central member that surrounds the stator core and an outer member that is connected to the central member in the axial direction of the stator core,
   wherein the outer member comprises a wall surface substantially parallel to a direction in which the central member and the outer member are arranged, and
   wherein a groove is recessed in a direction orthogonal to the wall surface and configured to be traversed by a portion of the coil.

2. The stator according to claim 1, wherein
   the outer member further comprises a first wall forming a wall of the groove on an outer side of the stator, and a second wall forming a wall of the groove on an inner side of the stator.

3. The stator according to claim 2, wherein the first wall is lower in height than the second wall.

4. The stator according to claim 3, wherein the second wall comprises a first recess having a shape extending in a thickness direction, and wherein an end of the coil is configured to be inserted into the first recess.

5. The stator according to claim 4, wherein the first wall comprises a second recess having a shape extending in a thickness direction, and wherein the end of the coil is configured to be inserted into the second recess after the first recess.

6. The stator according to claim 5, wherein the shape of the first recess and the shape of the second recess comprise different shapes.

7. The stator according to claim 6, wherein a depth of the first recess is larger than the depth of the second recess.

8. The stator according to claim 7, wherein a depth of the groove is larger than the first recess.

9. A transducer for converting between electrical energy and mechanical energy, comprising:
a stator core configured to have a shape extending along an axial direction and having a side surface extending in the axial direction;
an insulator disposed on the side surface of the stator core; and
a coil having a linear shape and wound around the side surface of the stator core with the insulator interposed therebetween,
wherein the insulator comprises a central member and an outer member, and the outer member connected to the central member in the axial direction of the stator core,
wherein the outer member comprises a wall surface substantially parallel to a direction in which the central member and the outer member are arranged, and
a groove recessed in a direction orthogonal to the wall surface;
a rotor member disposed in a central opening of a stator assembly, and having an axis orthogonal to an opening surface; and
a busbar connected to the coil of the stator assembly, wherein
the busbar comprises a base portion in an annular shape, and
a connection terminal in a plate shape connected to the base portion and connected to the coil, and
wherein connection terminal is configured to be fitted into the groove together with an end of the coil.

10. The transducer according to claim 9, wherein the connection terminal includes
a main part in a plate shape, and
a tongue portion extending from an end in a width direction of the main part and configured to be compressed with the end of the coil together with the main part.

11. A stator assembly, comprising:
a first stator and a second stator adjacent to each other in an annular shape, and each of the first stator and the second stator comprising:
a stator core having a shape extending along an axial direction, and having a side surface extending in the axial direction;
a stator core configured to have a shape extending along an axial direction and having a side surface extending in the axial direction;
an insulator disposed on the side surface of the stator core; and
a coil having a linear shape and wound around the side surface of the stator core with the insulator interposed therebetween,
wherein the insulator comprises a central member and an outer member, and the outer member connected to the central member in the axial direction of the stator core,
wherein the outer member comprises a wall surface substantially parallel to a direction in which the central member and the outer member are arranged, and
a groove recessed in a direction orthogonal to the wall surface,
wherein the groove is formed by an opening on a first side surface and a second side surface of the outer member,
the opening of the groove on the first side surface of the first stator, and an opening of the groove on the second side surface of the second stator are opposed to each other.

12. The stator assembly according to claim 11, wherein the outer member further comprises a first wall forming a wall of the groove on an outer side of the first stator and the second stator, and a second wall forming a wall of the groove on an inner side of each of the first stator and the second stator.

13. The stator assembly according to claim 12, wherein the first wall is lower in height than the second wall.

14. The stator assembly according to claim 13, wherein the second wall comprises a first recess having a shape extending in a thickness direction, and wherein an end of the coil is configured to be inserted into the first recess.

15. The stator assembly according to claim 14, herein the first wall comprises a second recess having a shape extending in a thickness direction, and wherein the end of the coil is configured to be inserted into the second recess after the first recess.

16. The stator assembly according to claim 15, wherein the shape of the first recess and the shape of the second recess comprise different shapes.

17. The stator assembly according to claim 16, wherein a depth of the first recess is larger than the depth of the second recess.

18. The stator assembly according to claim 17, wherein a depth of the groove is larger than the first recess.

* * * * *